(12) United States Patent
Hwang

(10) Patent No.: US 7,006,972 B2
(45) Date of Patent: Feb. 28, 2006

(54) GENERATING A TASK-ADAPTED ACOUSTIC MODEL FROM ONE OR MORE DIFFERENT CORPORA

(75) Inventor: Mei Yuh Hwang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 10/103,642

(22) Filed: Mar. 20, 2002

(65) Prior Publication Data

US 2003/0182121 A1    Sep. 25, 2003

(51) Int. Cl.
*G10L 15/06*    (2006.01)
(52) U.S. Cl. ............................... 704/244; 704/254
(58) Field of Classification Search .................. None
See application file for complete search history.

(56) References Cited

U.S. PATENT DOCUMENTS

| | | | | |
|---|---|---|---|---|
| 5,675,707 | A * | 10/1997 | Gorin et al. | 704/257 |
| 6,021,384 | A * | 2/2000 | Gorin et al. | 704/1 |
| 6,173,261 | B1 * | 1/2001 | Arai et al. | 704/257 |
| 6,205,426 | B1 * | 3/2001 | Nguyen et al. | 704/255 |
| 6,430,551 | B1 * | 8/2002 | Thelen et al. | 707/3 |
| 6,681,206 | B1 * | 1/2004 | Gorin et al. | 704/243 |
| 2002/0087314 | A1 * | 7/2002 | Fischer et al. | 704/255 |

OTHER PUBLICATIONS

Investigating Lightly Supervised Acoustic Model Training, by Lori Lamel et al. 2001 IEEE International Conference on Acoustics, Speech, and Signal Processing May 7-11, 2001, Salt Lake City, UT, USA.
Confidence-Measure-Driven Unsupervised Incremental Adaptation For HMM-Based Speech Recognition, by Delphine Charlet. 2001 IEEE International Conference on Acoustics, Speech, and Signal Processing May 7-11, 2001, Salt Lake City, UT, USA.
Towards Task-Independent Speech Recognition by Fabrice Lefevre et al. 2001 IEEE International Conference on Acoustics, Speech, and Signal Processing May 7-11, 2001, Salt Lake City, UT, USA.

* cited by examiner

*Primary Examiner*—Richemond Dorvil
*Assistant Examiner*—Donald L. Storm
(74) *Attorney, Agent, or Firm*—Joseph R. Kelly; Westman, Champlin & Kelly, P.A.

(57) ABSTRACT

The present invention generates a task-dependent acoustic model from a supervised task-independent corpus and further adapted it with an unsupervised task dependent corpus. The task-independent corpus includes task-independent training data which has an acoustic representation of words and a sequence of transcribed words corresponding to the acoustic representation. A relevance measure is defined for each of the words in the task-independent data. The relevance measure is used to weight the data associated with each of the words in the task-independent training data. The task-dependent acoustic model is then trained based on the weighted data for the words in the task-independent training data.

20 Claims, 17 Drawing Sheets

GENERATING A TASK-ADAPTED ACOUSTIC MODEL FROM ONE OR MORE DIFFERENT CORPORA

BACKGROUND OF THE INVENTION

The present invention relates to speech recognition. More specifically, the present invention relates to generating a task-related acoustic model for a speech recognizer from one or more different corpora, such as a supervised task-independent training corpus, and then adapted by an unsupervised task-dependent training corpus.

Conventional speech recognition engines compare an input signal, representative of an utterance of speech to be recognized, against speech and language related models. The speech recognizers then output a recognition result indicative of recognized speech (recognized from the input signal) based on the comparison against the models.

Most state-of-the-art speech recognition systems include two major components in their modeling techniques. Those components include a language model and an acoustic model.

The language model models the linguistic context of lexical units, which are usually words. A popular language model for dictation is an n-gram model. In the n-gram model, the likelihood of the next word, given a history of n−1 previous words, is predicted. Another type of language model is typically used on limited domain applications. That model is a context-free grammar, and is used where the input utterance is expected to follow a more strict sequence of words than is required for a general dictation system.

For example, in a system where a user is expected to answer the question "how old are you?", the system may use a context-free grammar which begins with optional words "I am" followed by a number, and then followed by optional words "years old". Such a stricter model constrains the search space and makes the recognition task both easier and faster.

An acoustic model models the sound produced by a human speaker. The acoustics vary partly based on the characteristics of the speaker. For example, the acoustics can vary based on different speakers, the accents of the speaker, or the speaking style, etc. However, the acoustics can vary based on other criteria as well, such as the particular microphone being used on the input end to the speech recognizer, the environment in which the speech recognizer is being used, the application domain in which the speech recognizer is operating, etc.

In order to generate a general acoustic model which is to be used in an application that is both speaker-independent and task-independent, a wide variety of data is used. For example, speech training data gathered from different speakers, different tasks, different microphones, etc., is simply pooled together and the parameters of the acoustic model are estimated without bias. The training corpus typically includes a plurality of different utterances represented by WAV files. Corresponding to each WAV file is a manual transcription of the words represented by the WAV file. Such a training corpus is referred to as supervised data, in that a laborious manual transcription has been preformed which corresponds exactly to the words spoken in the WAV file.

However, it is well known that a speaker-dependent acoustic model (one in which the acoustic model is trained on a single speaker and used by the same speaker only) produces two-three times lower word error rate than a speaker-independent acoustic model. Therefore, conventional dictation systems usually encourage the user to spend varying amounts of time "enrolling" himself or herself in the system. This often entails reading some pre-selected texts to the system for at least several minutes, and in many cases much longer.

Similarly, a task-dependent acoustic model (one in which the acoustic model is trained on only those utterances that are related to the task for which the acoustic model will be used) performs significantly better than a task-independent acoustic model. Such a system is discussed in F. Lefevre, J-L Gauvain and L. Lamel, *Towards Task Independent Speech Recognition,* ICASSP-2001.

In order to adapt a task-independent acoustic model to become a task-dependent acoustic model, one proposed solution has been to collect a task-dependent acoustic corpus and transcribe the acoustic corpus manually. However, sparse data presents a problem, in that collecting a sufficient amount of task-dependent data and manually transcribing it is a tedious and costly process.

Another way to adapt an acoustic model, which has been proposed in the past, is to use an existing body of close-captioned data. Such data is referred to as "lightly supervised data" in L. Lamel, J-L Gauvain and G. Adda, *Investigating Lightly Supervised Acoustic Model Training,* ICASSP-2001, because transcription generated during close-captioning is error prone and is generally not of good quality. In addition, the close-captioned data must be sorted through to obtain data that is task-dependent as well. A further problem with using lightly supervised data is that during close-captioning, phrase segmentation information may not be available.

Yet another proposed solution is to simply collect a huge amount of task-independent data, and simply hope that enough of the data is relevant to the task at hand that the acoustic model can be adequately trained. Of course, this is uncertain and can be costly and time consuming as well.

Still a further proposed solution is to use unsupervised training data, (data which has no manual transcription) and feed that data into a speech recognizer to obtain the associated transcription. However, a primary problem with using unsupervised training data is that it is unsupervised. Therefore errors in the first-pass speech recognition update incorrect parameters in the acoustic model and render this proposed solution inefficient.

The present invention addresses one or more of the problems discussed above.

SUMMARY OF THE INVENTION

This invention involves three major components. First of all, we propose a method of combining task independent supervised or unsupervised training corpora to better suit the task in interest by defining "task relevance" for each unit of speech in the training data. Usually the unit is a word. Training data is weighted by the task relevance to generate a task-related acoustic model. Our lab experiments showed 3% error rate reduction compared with blindly combining all available data together.

Unsupervised task dependent speech data is provided to a speech recognizer that recognizes the speech data and outputs a recognition result along with a confidence measure for each recognized word. A task-dependent acoustic model is generated based on the recognition result, the speech data and the confidence measure. The speech data is weighted by the confidence measure so that only data that has been recognized with a high degree of confidence will weigh heavily in generation of the acoustic model.

Finally the task dependent acoustic model is smoothed with the task related acoustic model, depending on the occupancy count of each parameter (such as senone) from the task dependent data. Our lab experiments showed a 11% error rate reduction after unsupervised confidence-based training compared with task independent acoustic model.

BRIEF DESCRIPTION OF THE DRAWINGS

FIGS. 2, 2-1 and 2-2 are block diagrams briefly showing embodiments for generation of a task-related model.

FIG. 11-1 is a block diagram of one embodiment of a system for generating a task-adapted acoustic model.

FIG. 11-2 is a plot of weight verus occupancy count.

FIG. 12-1 is a flow diagram better illustrating the generation of a composite acoustic model based on weighted contributions of other acoustic models.

DETAILED DESCRIPTION OF ILLUSTRATIVE EMBODIMENTS

The present invention is a system and method for generating a task-dependent (or task-adapted) acoustic model from a task-independent training corpus. The present invention uses different mechanisms for extracting relevant data from the task-independent training corpus and uses that data to generate the task-dependent acoustic model, while avoiding a sparse data problem.

DETAILED DESCRIPTION OF ILLUSTRATIVE EMBODIMENTS

Figure 1:
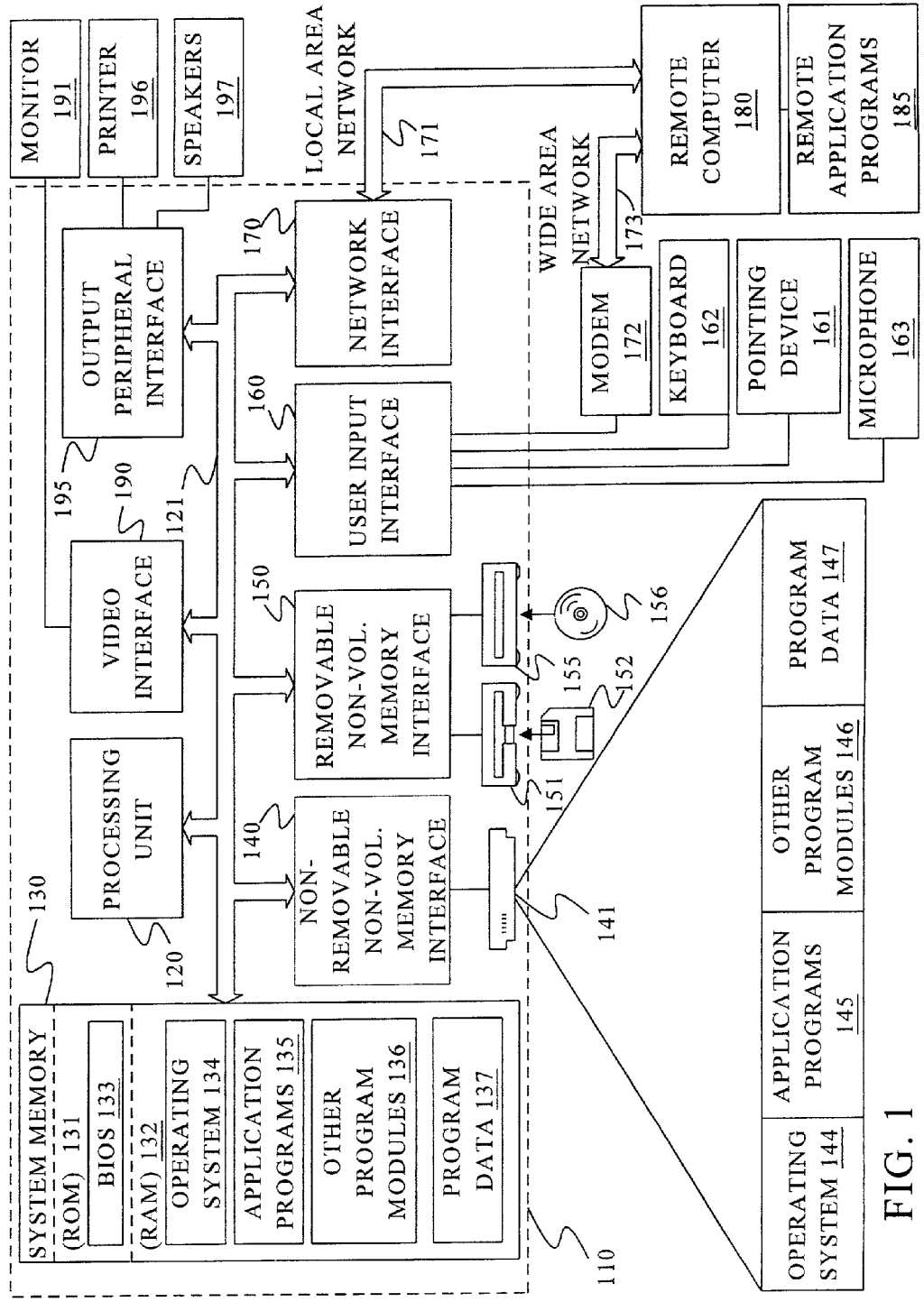
FIG. 1 is a block diagram of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Prior to discussing the present invention in greater detail, a number of abbreviations used herein are identified as follows:
  TI: Task Independent;
  TD: Task Dependent;
  TA: Task Adapted;
  HMM: Hidden Markov Model;
  ML: Maximum Likelihood;
  AM: Acoustic Model;
  LM: Language; and
  MMIE: Maximum Mutual Information Estimation.

Figure 2:
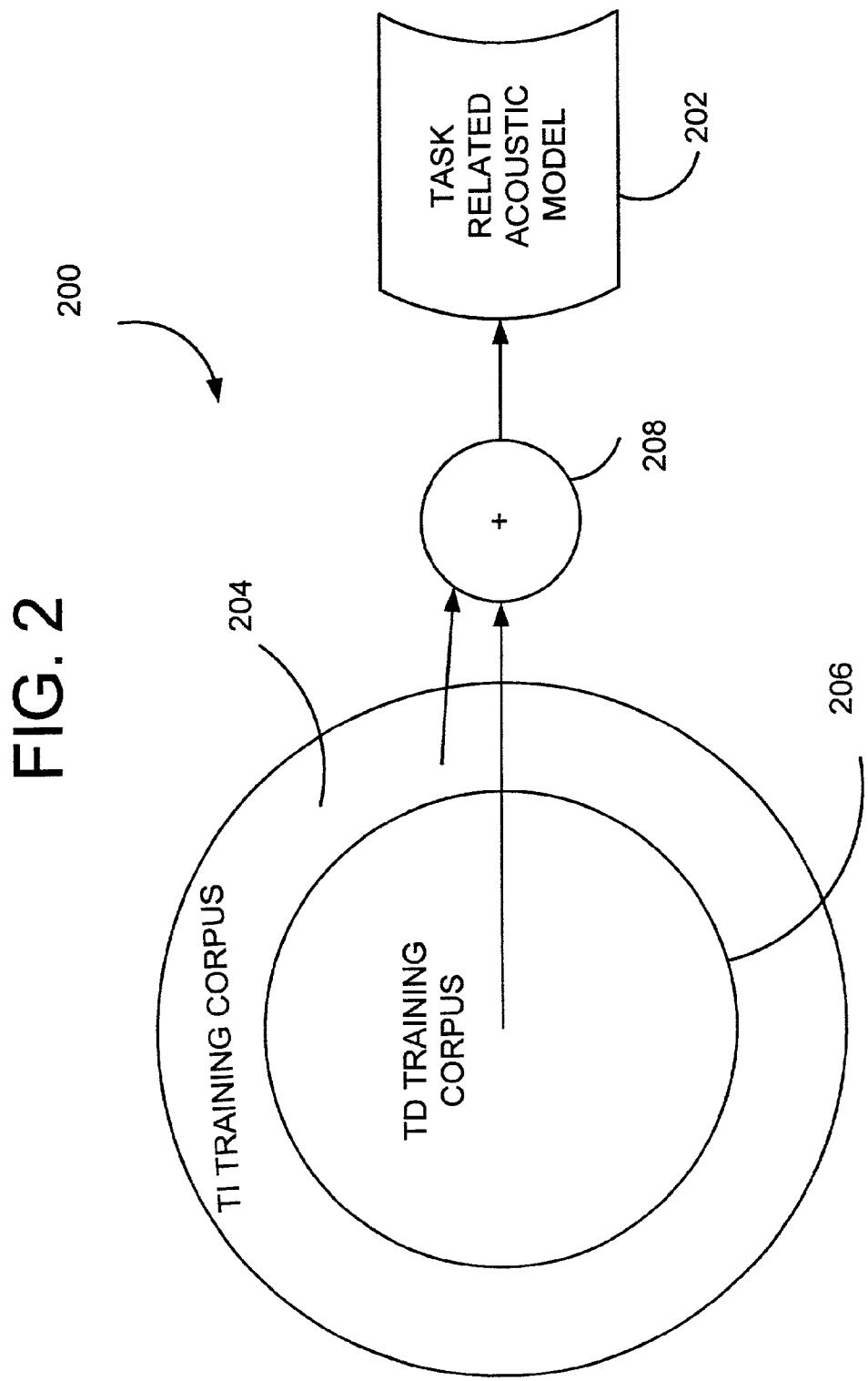
FIG. 2 is a block diagram illustrating the general method for training a task-related (or task-adapted) acoustic model.

FIG. 2 is a diagram that generally illustrates a high level view of a system 200 for generating a task-related acoustic model 202 from a task-independent supervised training corpus 204. Task-independent training corpus 204 can be a known training corpus. For example, popular data collection agencies include Linguistic Data Consortium (LDC), Texas Instruments, and Oregon Graduate Institute, (OGI), as examples. These agencies provide detailed orthographic transcriptions for a fairly large number of sizable corpora, such as Macrophone, the Wall Street Journal, North America Broadcast News, Switch Boards, TI Digits, etc. In addition, these transcriptions are typically provided in a number of different languages. Such transcriptions are created and verified manually (and thus called supervised data) and are of high quality. Thus, task-independent training corpus 204 can be one of these, or any other task-independent training corpus.

As discussed in the background portion of the specification, it is difficult to categorize data in a task independent training corpus 204 into different tasks. For example, assuming the task in which acoustic model 202 is to be used is a stock quote application, a weather forecasting application or a travel web site application, it would be highly advantageous to train acoustic model 202 based on task-dependent terms which would be found in the particular task in which the acoustic model 202 is to be used. However, though task-independent training corpus 204 certainly contains such task-dependent data 206, it is difficult to extract task-dependent utterances 206 and to train acoustic model 202 based on that data.

Some of the problems are discussed in the background portion of the specification. For example, sparse data presents a problem in that the amount of specifically task-dependent data 206 in corpus 204 may be so small that it is difficult to train an acoustic model 202 based on that small amount of data.

Therefore, in accordance with one embodiment of the present invention, a relevance measure for each word (relative to the task in which acoustic model 202 is to be used) in task-independent training corpus 204 is defined. The relevance measure is applied to the data associated with each word as a weighting factor. The words which are more relevant to the task at hand are weighted higher than those that are not as relevant. Thus, in one embodiment, all of the data in corpus 204 can be used in training acoustic model 202, but the task-dependent information 206 will simply be weighted more heavily. In that embodiment, both the task-independent data and the task-dependent data 206 are combined in a training process illustrated by block 208 to generate task-related or task-adapted acoustic model 202.

For simplicity of discussion, the present invention is described in a word-based task relevance paradigm from now on. That is, relevance is assigned on a word basis. Readers should keep in mind, however, that the same principle applies to other smaller (or even bigger) units as is described with respect to FIGS. 7 and 8. We will also use TR(w) or $\rho(w)$ interchangeably to represent a task relevance coefficient. Finally for ease of reference, the TD model trained with this task relevance approach is called a TR model.

TR Model 202 can be generated from TI corpus 204 in a variety of ways, and two exemplary ways will be described. First, (shown diagrammatically in FIG. 2-1) the TR model 202 is trained by weighting the occupancy counts, with TR(w), in the Forward-Backward (FB) (or Viterbi) HMM Maximum Likelihood training process implemented by a training component 216, using relevancy coefficients $\rho(W)$ 226 for each word in the TI corpus 204 as the weighting coefficient. This embodiment is described in greater detail with respect to FIGS. 3 and 4.

Alternatively, as briefly shown diagrammatically in FIG. 2-2, a set of TI acoustic word models $\lambda(w)$ 304 can first be trained by training component 216 from the TI training corpus 204. Then for each task in question, we combine (with combiner 318) the word models, $\lambda(w)$, 304 to obtain a TR model $\Lambda$ 320 by weighting these model parameters according to relevancy coefficients $\rho(w)$, 226. Notice different words, $w_1$ and $w_2$, may contain the same parameter in $\Lambda$, but they are combined by different weights $\rho(w_1)$ and $\rho(w_2)$. This embodiment is described in greater detail with respect to FIGS. 5 and 6.

There are advantages and disadvantages associated with each of the approaches in FIGS. 2-1 and 2-2. For example, one advantage of the approach shown in FIG. 2-2 is that the system need not keep the TI data available anymore once the statistics from each word w are computed and stored as model $\lambda(w)$, where $\lambda$ represents the model parameter. For each new task, the task relevance function $\rho$ is simply defined and then a TR model $\Lambda$ can be generated by a linear combination of $\lambda(w_i)$ quickly. While in the first approach, the system retrains the TR model by using the raw training data, which can be more time consuming. The system also maintains the training waves and transcriptions available.

However, the approach shown in FIG. 2-2 has increased disk requirements necessary to store all the word models $\lambda(w_i)$, since the same parameters are overlapped by different $\lambda(w_i)$ models.

Figure 3:
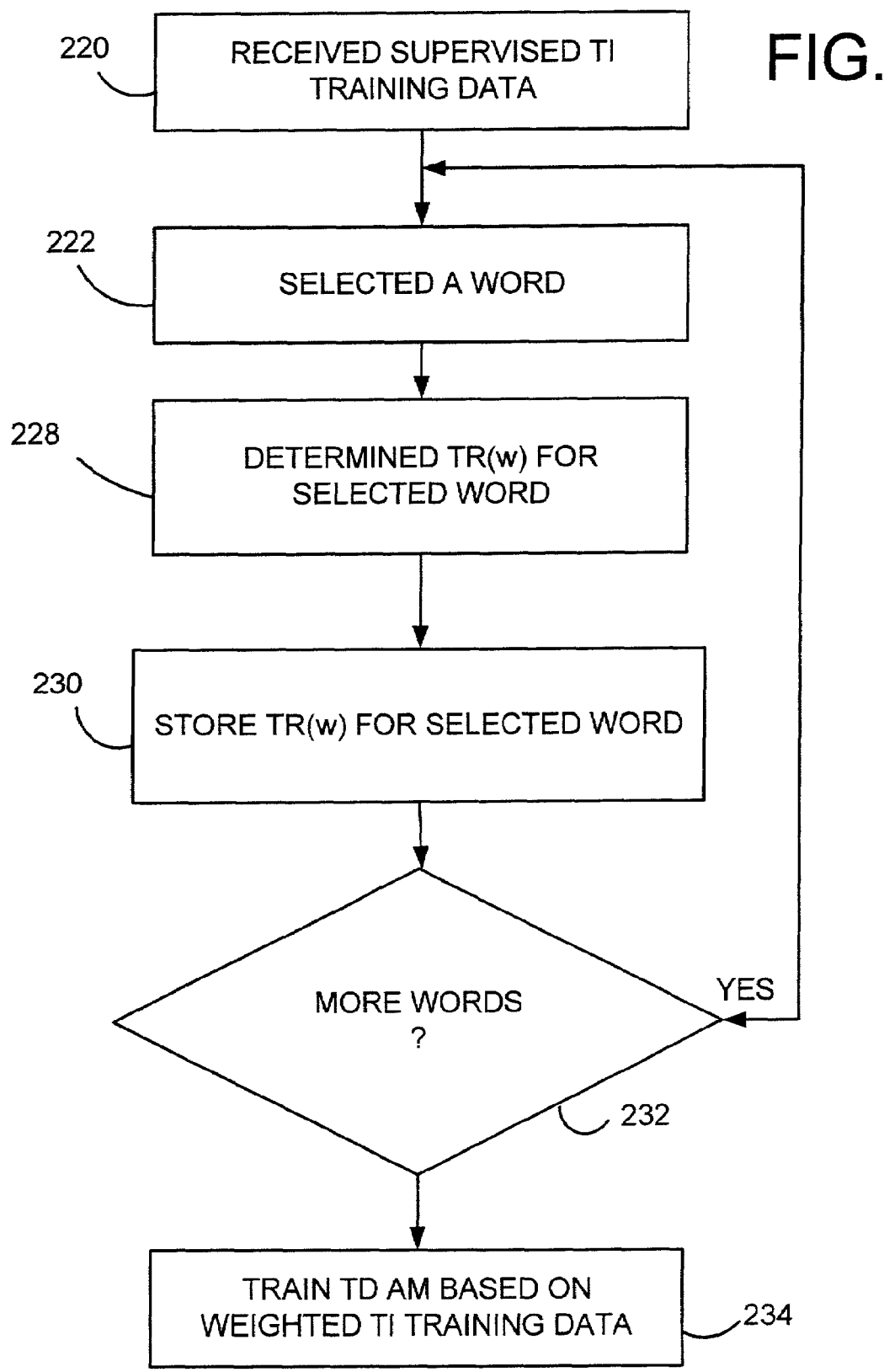
FIG. 3 is a flow diagram which better illustrates the process of generating a task-dependent acoustic model in accordance with one embodiment of the present invention.

The two exemplary approaches are now discussed in greater detail. FIG. 3 is a flow diagram better illustrating operation of the embodiment of FIG. 2-1 in which acoustic model 202 is generated. Similar items are similarly numbered. FIG. 3 will be described with respect to FIG. 4 as well which is a more detailed block diagram of a system 209 used to generate acoustic model 202.

Figure 4:
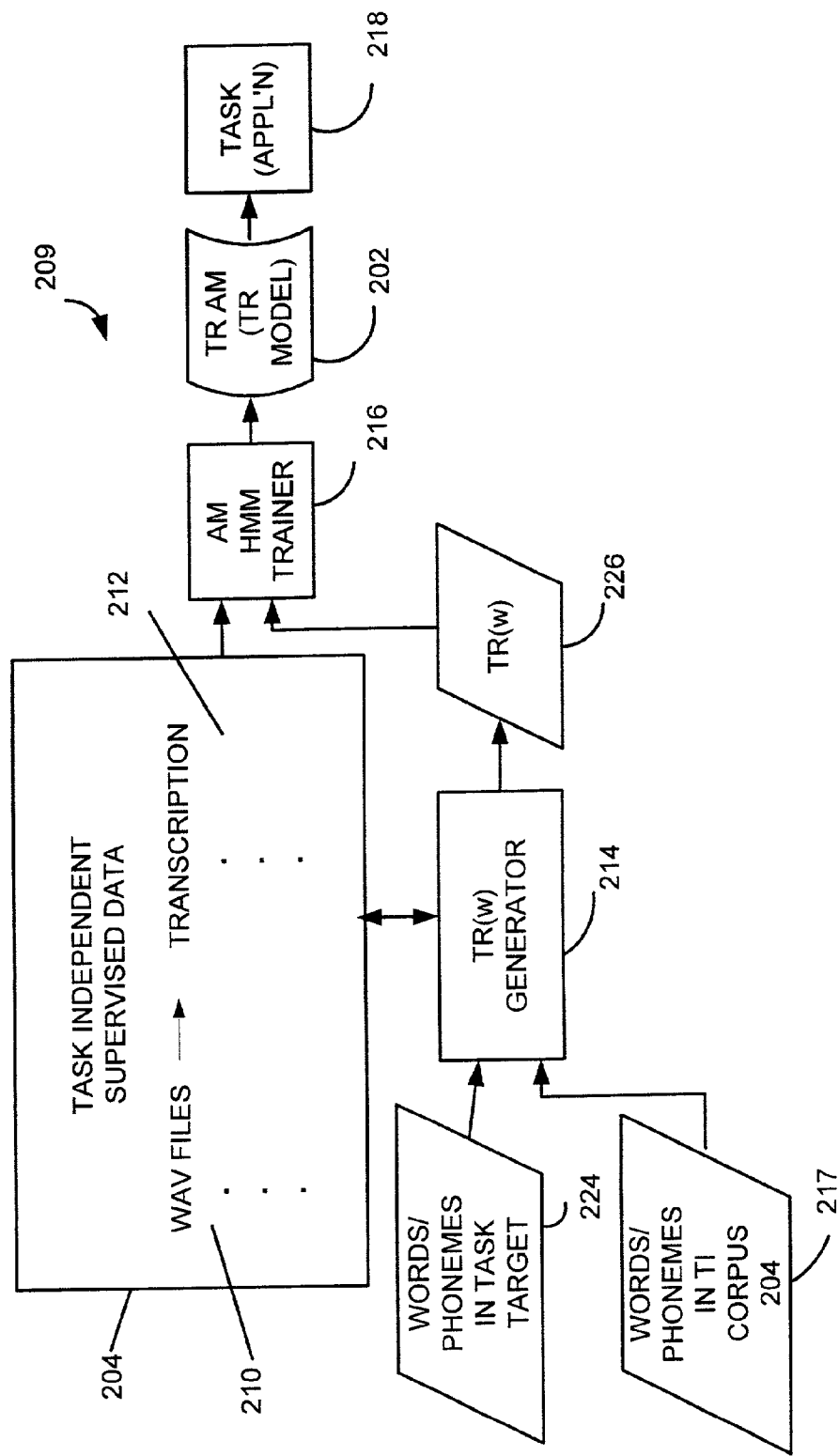
FIG. 4 is a block diagram illustrating a system used to generate the task-dependent acoustic model in accordance with one embodiment of the present invention.

FIG. 4 shows task-independent training corpus 204 in greater detail. It can be seen in FIG. 4 that corpus 204 is a supervised task-independent training corpus and thus includes a plurality of WAV files 210, each of which represents a speech utterance (such as a sentence). Associated with each WAV file is a manual transcription 212. System 209 also includes a relevance generator 214 that generates a relevance or a task-relevance TR(w) for each word (w). Further, FIG. 4 includes an acoustic model training component (such as a Hidden Markov Model training component) 216 which trains the acoustic model 202. FIG. 4 also shows that acoustic model 202 can be provided to a task (such as an application) 218.

FIG. 3 shows that system 209 first receives supervised task-independent training corpus (or data) 204. This is indicated by block 220 in FIG. 3.

Relevance generator 214 then selects a word 217 from corpus 204. This is indicated by block 222. It should be noted that, in the embodiment shown in FIG. 4, relevance generator 214 also has access to the words or phonetic units (such as phones) that are relevant to, or found in, task application 218. Such words or phones (or other desired speech units) are illustrated by block 224 in FIG. 4. It should also be noted that task relevance can be defined at different levels as well, such as at the triphone level or quinphone level.

The input 224 to relevance generator 214 can take a variety of different forms. For instance, given an application task 218, system 209 thus has a defined lexicon (which can be a list of words in interest). If an n-gram language model (illustratively one which is trained on a large amount of task-dependent text) or a context-free grammar is available for the application task 218, these models can be used as the input 224 to the relevance generator 214.

Relevance generator 214 generates a relevance measure TR(w) for each word (w) in task-independent supervised training corpus 204. The relevance measure is indicated by block 226 in FIG. 4 and the method of defining the relevance measure for the selected word is indicated by block 228 in FIG. 3. There are different ways for generating the relevance measure 226 and two examples of those are discussed below with respect to FIGS. 7 and 8.

Each relevance measure 226 is then stored for the associated, selected word as indicated by block 230 in FIG. 3. Relevance generator 214 does this for each word in the TI training corpus 204 as indicated by block 232.

Once the relevance measure for each word has been obtained, trainer 216 trains the task-dependent acoustic model 202 based on the weighted task-independent training data in corpus 204. This is indicated by block 234 in FIG. 3. It can thus be seen that system 209 has effectively extracted task-dependent data from corpus 204 and used it (by weighting it more heavily) in generating a task-dependent acoustic model.

Figure 5:
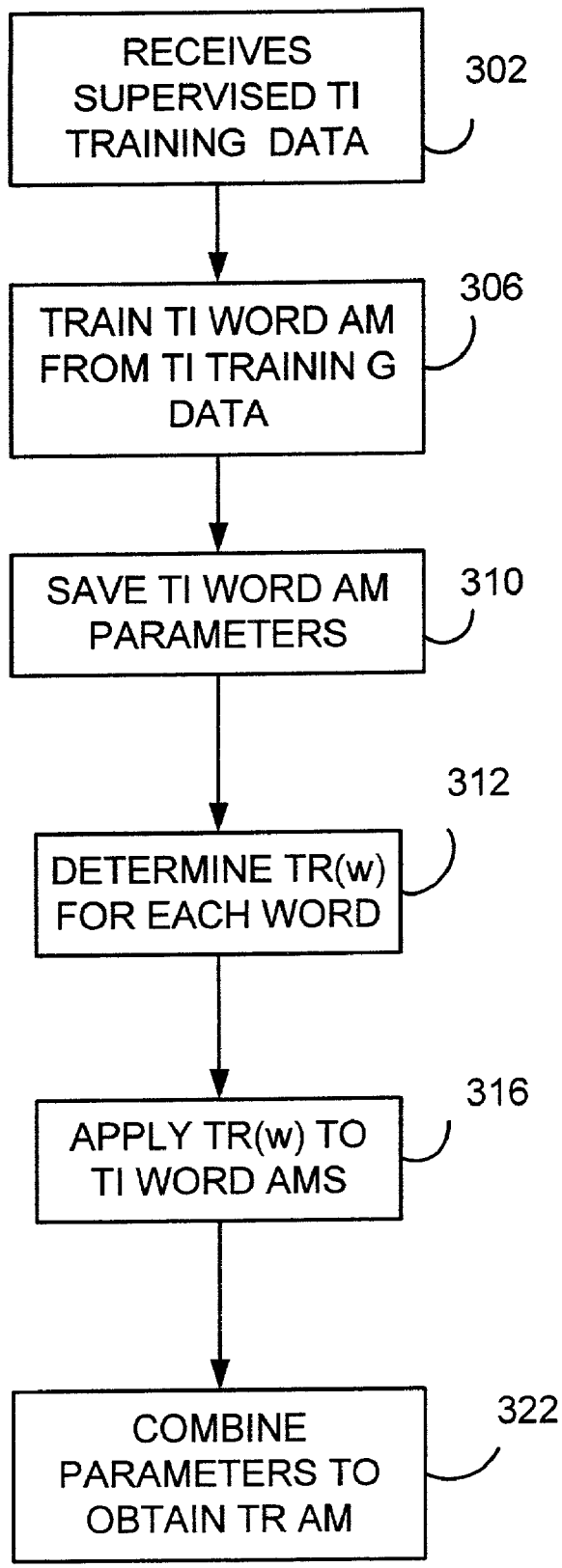
FIG. 5 is a flow diagram illustrating a method of generating a task-dependent acoustic model in accordance with another embodiment of the present invention.
Figure 6:
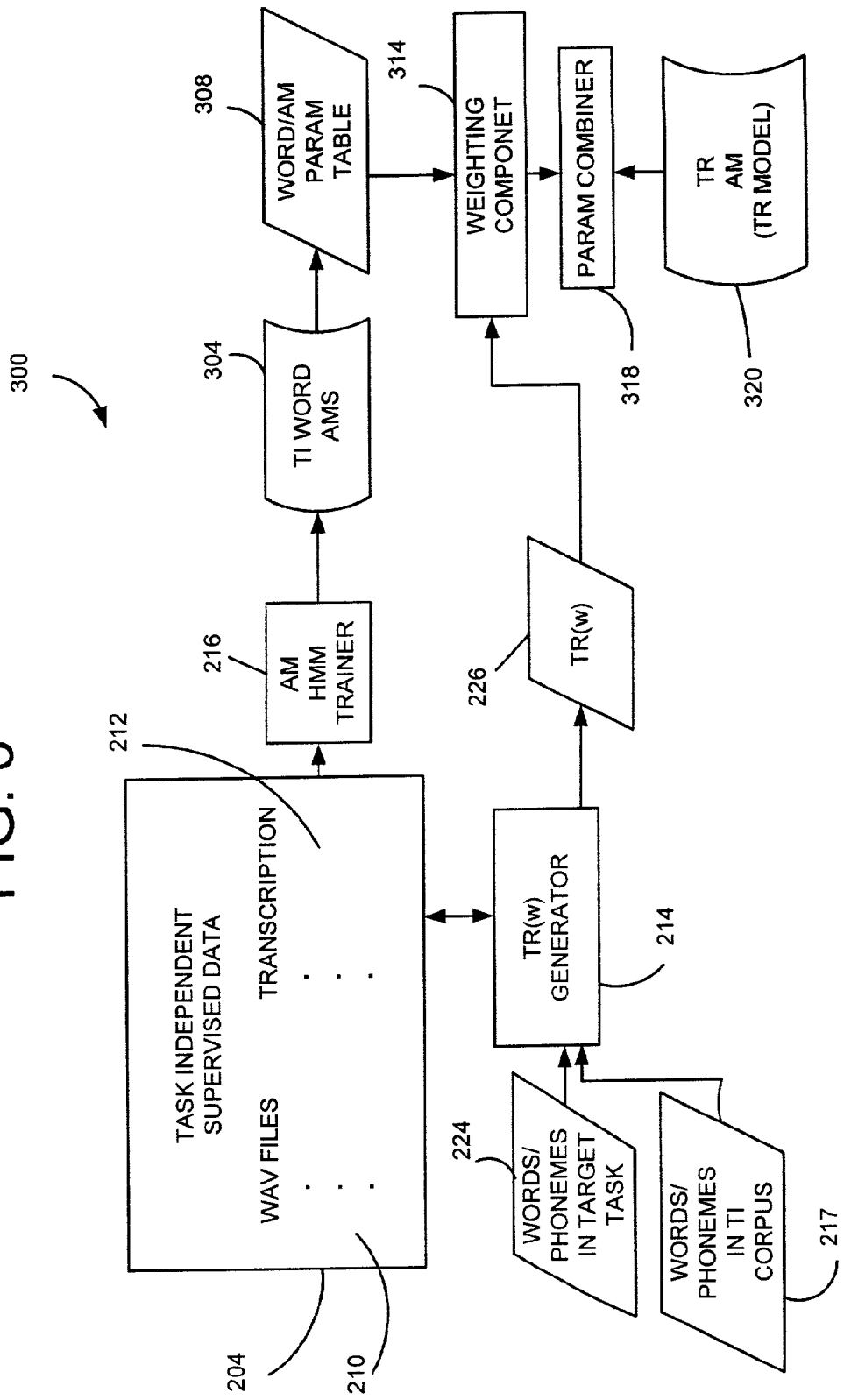
FIG. 6 is a block diagram illustrating a system for generating the task-dependent acoustic model using the method shown in FIG. 5.

FIG. 5 is a flow diagram illustrating another embodiment (shown in FIG. 2-2) for generating a task-related (or task-adapted) acoustic model from a task-independent corpus. Similar items are numbered similar to those shown in FIG. 2-2. FIG. 6 is a more detailed block diagram of a system 300 for generating the acoustic model in accordance with the flow diagram shown in FIG. 5. The two Figures will now be described in conjunction with one another. System 300 is similar, in some respects, to system 209 shown in FIG. 4, and similar items are similarly numbered. However, a number of differences will become apparent as the description proceeds.

System 300 first receives task-independent, supervised training corpus 204. This is indicated by block 302 in FIG. 5. Then, acoustic model training component 216 trains task-independent acoustic models 304 for the words in the task-independent corpus 204. This is indicated by block 306 in FIG. 5. In training the task-independent acoustic models 304, trainer 216 generates a table of words and acoustic model parameters associated with those words. This table is indicated by block 308 in FIG. 6. Thus, the words and acoustic model parameters from task-independent acoustic models 304 are saved as indicated by block 310 in FIG. 5.

Relevance generator 214 also generates a relevance measure 226 for each word in corpus 204, given an application task. This is indicated by block 312 in FIG. 5.

The relevance measures 226 are then applied to the word model parameters for the words stored in table 308. In other words, each word model parameter is weighted by its relevance measure TR(w) by weighting component 314. This is indicated by block 316 in FIG. 5. Then, the weighted acoustic model parameters are combined by parameter combination component 318 in order to obtain task-adapted (or task-related) acoustic model 320. This is indicated by block 322 in FIG. 5.

In applying the weights to the acoustic model parameters, assume that during the known Baum-Welch training process, the acoustic model parameters in table 308 are generated for each word in the vocabulary. This is a statistically sufficient representation of the original speech corpus 204, divided by the vocabulary. In order to weight the parameters to a specific task, the parameters are combined putting heavier weights on those counts (estimates) generated by task-related words. Task-related acoustic model 320 is thus more specifically adapted to the task at hand.

The relevance measure will now be discussed in greater detail. A relevance measure may best be defined for an entire utterance, or even a whole paragraph. However, it is often difficult to define the concept of a "task" and thus difficult to classify how relevant an utterance is with respect to the task in question. Therefore, one embodiment of the present invention illustratively defines the relevance measure on a word basis. We may combine the task relevance of each word in a sentence to define the task relevance of the sentence. But to simplify discussion here, we assume we are dealing with word relevance only. That is, for each word w in the TI training corpus, define $0<=\rho(w)<=1$ to be the task relevance coefficient. In the simplest definition:

$\rho(w)=1$ if $w$ is in the TD vocabulary     Eq. 1

$\rho(w)=0$ otherwise     Eq. 2

However, if the TI data (such as the popular LDC Macrophone corpus) does not contain a large number of TD words (such as a name directory assistance task), this simple definition will reject most TI training data, and thus render an under-trained TD acoustic model. In this situation, a more sophisticated $\rho$ function such as the following should be defined:

$\rho(w)$=#TD triphones in this word/#phones in this word     Eq. 3 or $\rho(w)$=#TD "physical" triphones in this word/#phones in this word.     Eq. 4

A "physical" triphone, in a senone-based Hidden Markov Model (HMM) system, represents a cluster of triphones which share the same senone sequence in modeling their output density functions. For purposes of this application, the term "senone" means a Markov state representation of a cluster of similar Markov states. See Mei-Yuh Hwang and Xuedong Huang, SUBPHONETIC MODELING FOR SPEECH RECOGNITION, PROC-DARPA, Workshop on Speech and Natural Language, pp. 174–179 (1992).

The task relevance measure can also be defined at the triphone level, t. In that embodiment each word in the TI training corpus is expanded into a sequence of triphones per utterance. The task relevance function $\rho(t)$ is then defined as follows:

$\rho(t)=1$ if $t$ or physical ($t$) is in the TD vocabulary;     Eq. 5

$\rho(t)=\epsilon$ otherwise;     Eq. 6 where $\epsilon$ is a very small number, close to 0.

Figure 7:
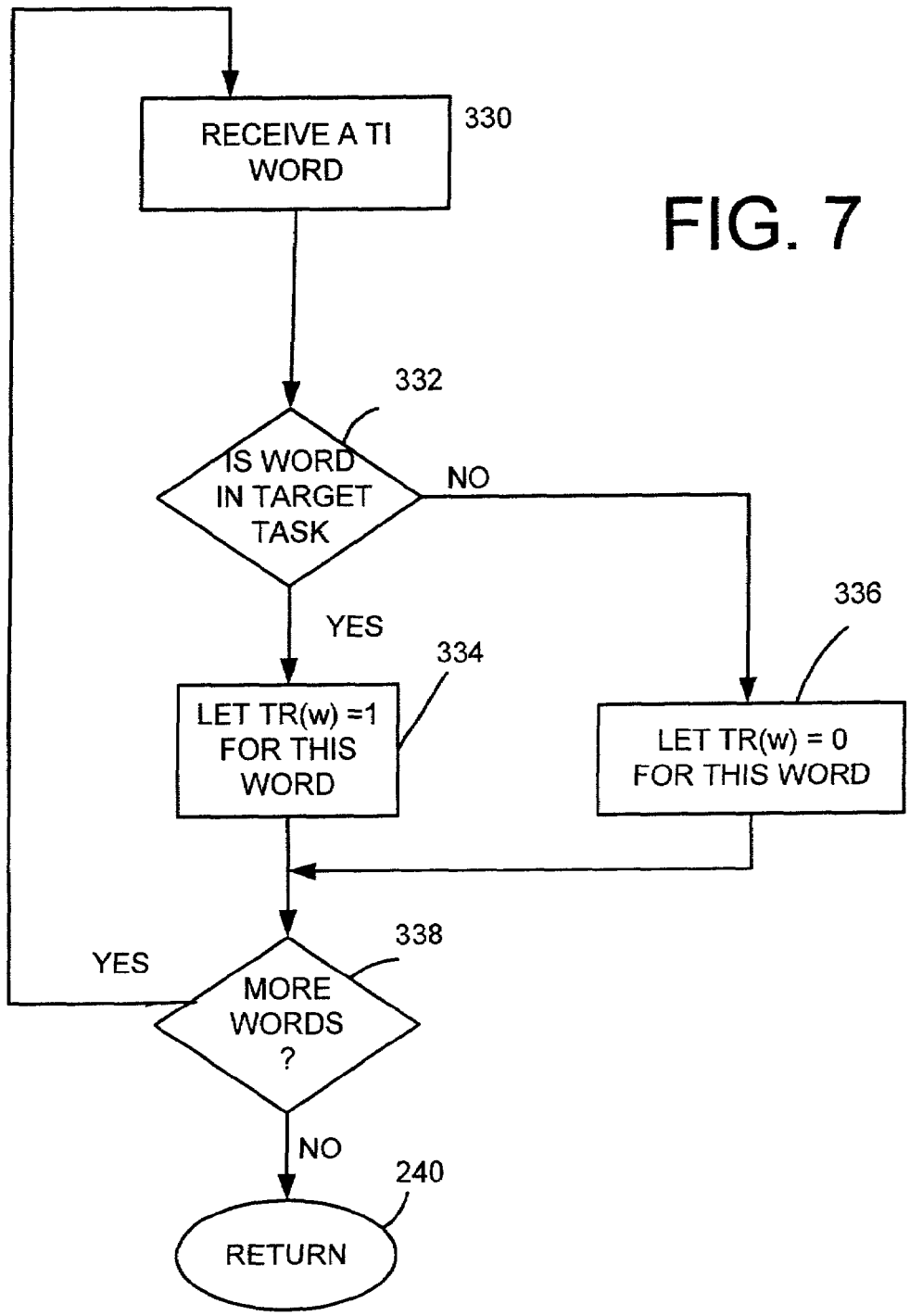
FIGS. 7 and 8 are flow diagrams illustrating two exemplary ways in which a relevance measure can be obtained in accordance with two exemplary embodiments of the present invention.
Figure 8:
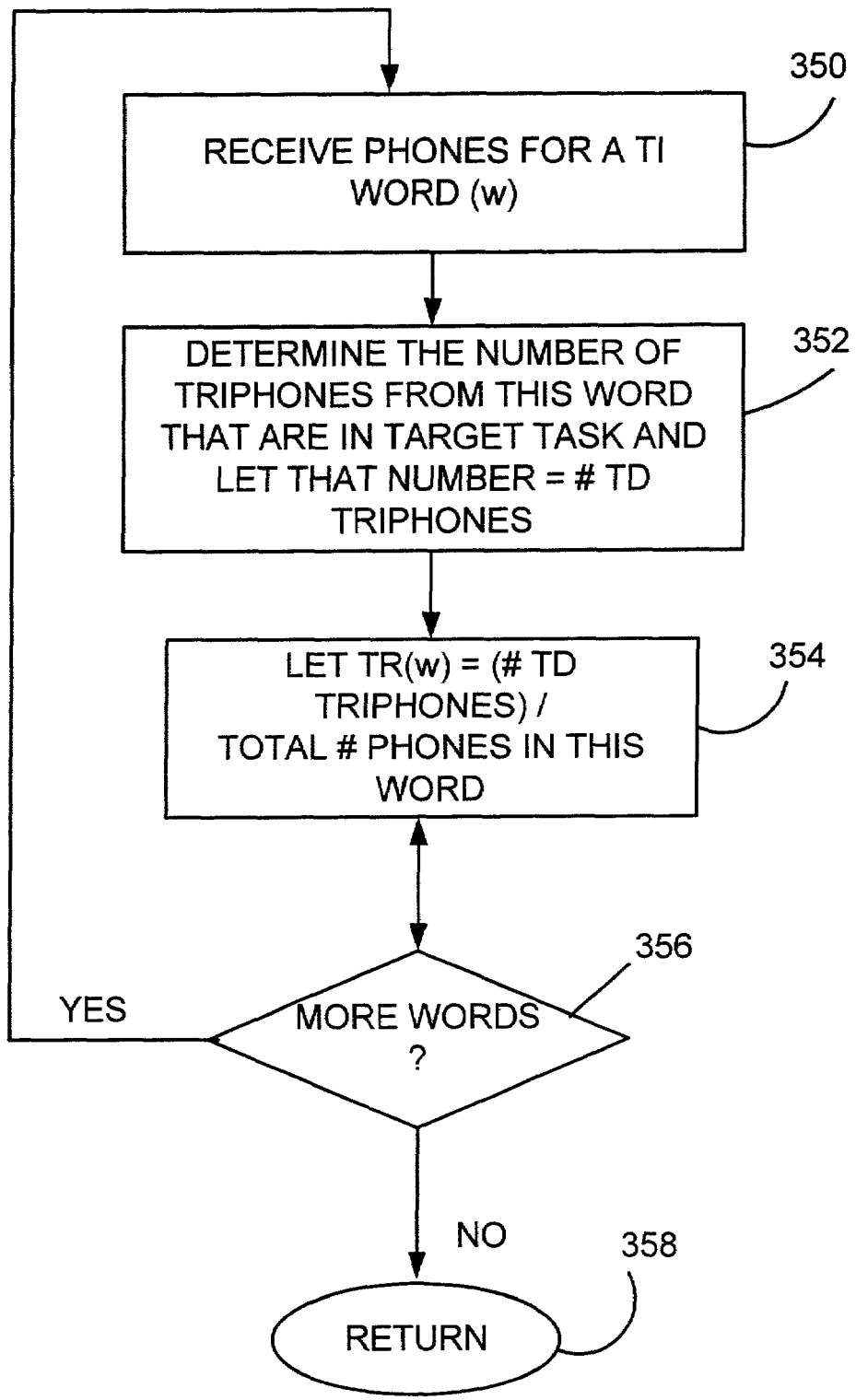

FIGS. 7 and 8 illustrate several exemplary embodiments for generating a relevance measure TR(w) (or $\rho(w)$). However, the present invention should not be limited to these relevance measures, as they are provided for exemplary purposes only.

In the embodiment shown in FIG. 7, relevance generator 214 first receives a word from the TI training corpus 204 as indicated by block 330. Next, in a simple embodiment, generator 214 simply determines whether the received word is in the target task. This is indicated by block 332. If so, then the relevance measure is set to a 1 for this word as indicated by block 334. If not, the relevance measure is simply set to a 0 as indicated by block 336.

Once the relevance measure for this word has been obtained, generator 214 determines whether there are additional words that need a relevance measure. This is indicated by block 338. If so, processing continues at block 330 until all words have received a relevance measure. However, if no words remain, then each word has a relevance measure, and the process concludes at block 340. In this embodiment, relevant words are weighted 100% while irrelevant words are simply discarded in the acoustic model training process. This type of relevance measure may be used where there is a sufficient amount of task-dependent data to adequately train an acoustic model with only that task-dependent data. However, this may not be the case.

Therefore, FIG. 8 shows an alternative exemplary embodiment of generating a relevance measure. In that embodiment, relevance generator 214 again receives a word as indicated by block 350. Then, relevance generator 214 determines the number of triphones from the current word that are in the target task. This is indicated by block 352 in FIG. 8. Relevance generator 214 identifies this number as the number of task-dependent triphones.

Next, relevance generator 214 defines the relevance for the present word TR(w) as follows:

$$TR(w) = \frac{\text{number of task dependent triphones}}{\text{total number of phones}} \qquad \text{Eq. 7}$$

In other words, the relevance measure is a ratio of the number of task-dependent triphones in the subject word divided by the total number of phones in the word. An example may be helpful.

Assume that the present word is the word "book". That word may illustratively be made up of the following phones (or phonemes):
b uk k.
Thus, the total triphones for the word book are shown as follows:
b uh
b uh k
uh k # where # represents a word boundary.

Assume also that the first and third triphones listed above appear in the task, but that the second triphone does not. In that case, the word "book" in the task-independent training data is given a relevance factor TR(w)=⅔ and it is weighted by that relevance factor.

Relevance generator 214 then determines whether any additional words need to have relevance measures generated therefore as indicated by block 356. If so, processing continues at block 350. But if not, processing is concluded at block 358.

The method set out in FIG. 8 is extremely efficient in addressing the sparse data problem. In other words, if the task-independent corpus does not have sufficient task-dependent, relevant words to adequately train an acoustic model, the data associated with many of the words can still be used in training a task-dependent acoustic model. A word having a large number of relevant portions or phones is weighted higher than a word that has a low number of relevant phones. Thus, a vast amount of data can still be used to train the task-dependent data model, even if the number of task-dependent, relevant words in the task-independent corpus is not great.

Particularly in our internal lab experiments, we were able to reduce the word error rate by 3% relatively with TR(w) training compared with the TI acoustic model. In that experiment, TR(w) was defined as the cube of the number of TD quinphones divided by the number of phones in this word.

Once the task-related acoustic model has been generated and deployed in an application, the system can save usage data to obtain additional task-dependent data. For example, assume that the task-independent training data is from the LDC Macrophone corpus (which has Wall Street Journal data, digits, and yes/no types of sentences recorded over the telephone) and the application is a weather look-up task by telephone. It can be assumed that the city names in the task-independent Macrophone corpus will be more heavily weighted than other words during the creation of the task-related acoustic model. In accordance with one embodiment of the present invention, once the application which deploys the task-dependent acoustic model is in use, the system will presumably receive phone calls. Of course, the WAV files generated during these phone calls can be stored and they will contain precisely task-dependent data. This data can be manually transcribed and used to retrain, or modify the task-related acoustic model to even further improve performance.

However, as discussed in the background portion above, manual transcription of this data is tedious, error prone, and can be costly. Therefore, in accordance with another embodiment of the present invention, unsupervised training data can be used to further improve the task-related acoustic model.

Figure 9:
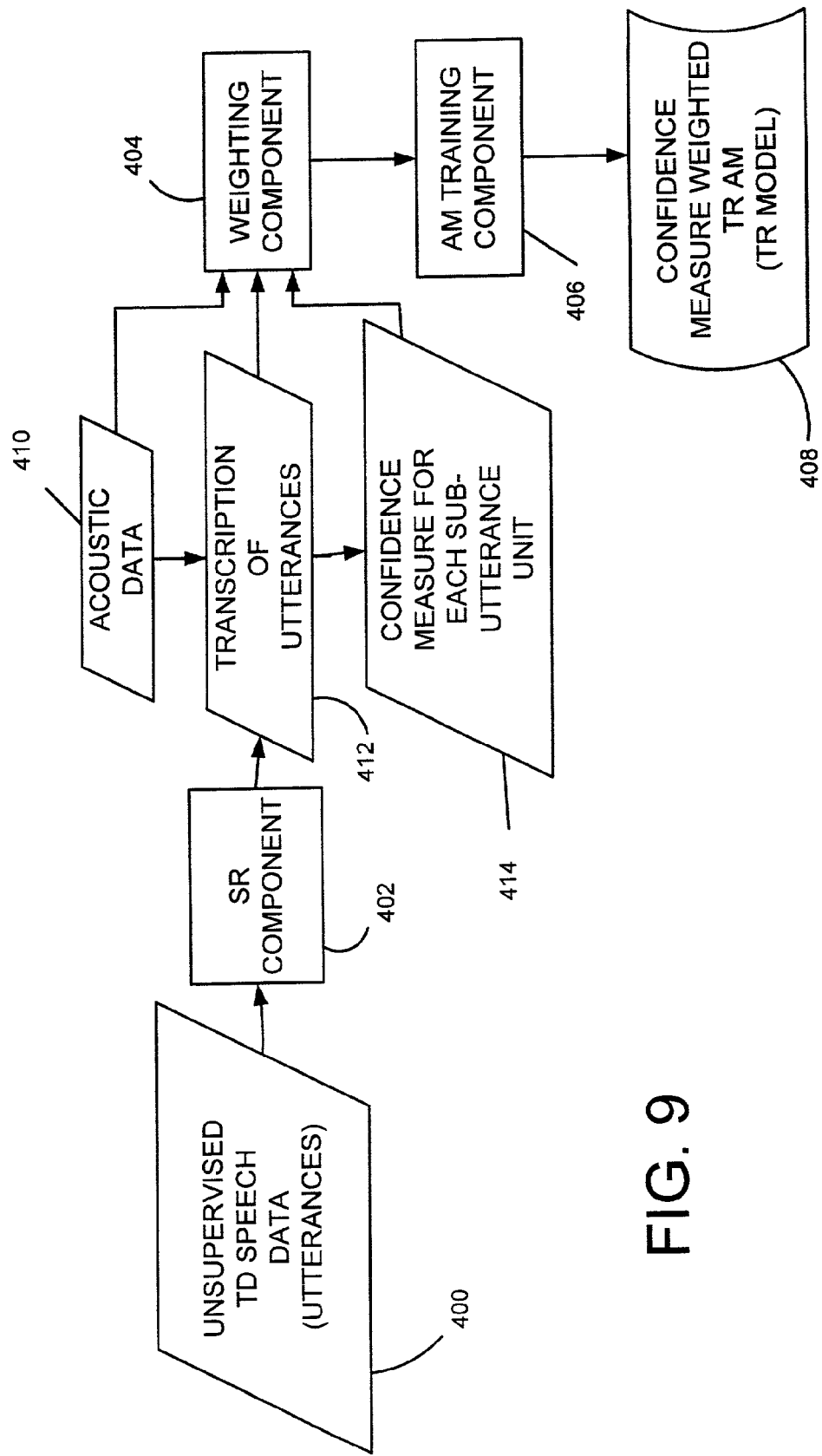
FIG. 9 is a block diagram of a system for generating a task-dependent acoustic model from unsupervised task-dependent speech data.
Figure 10:
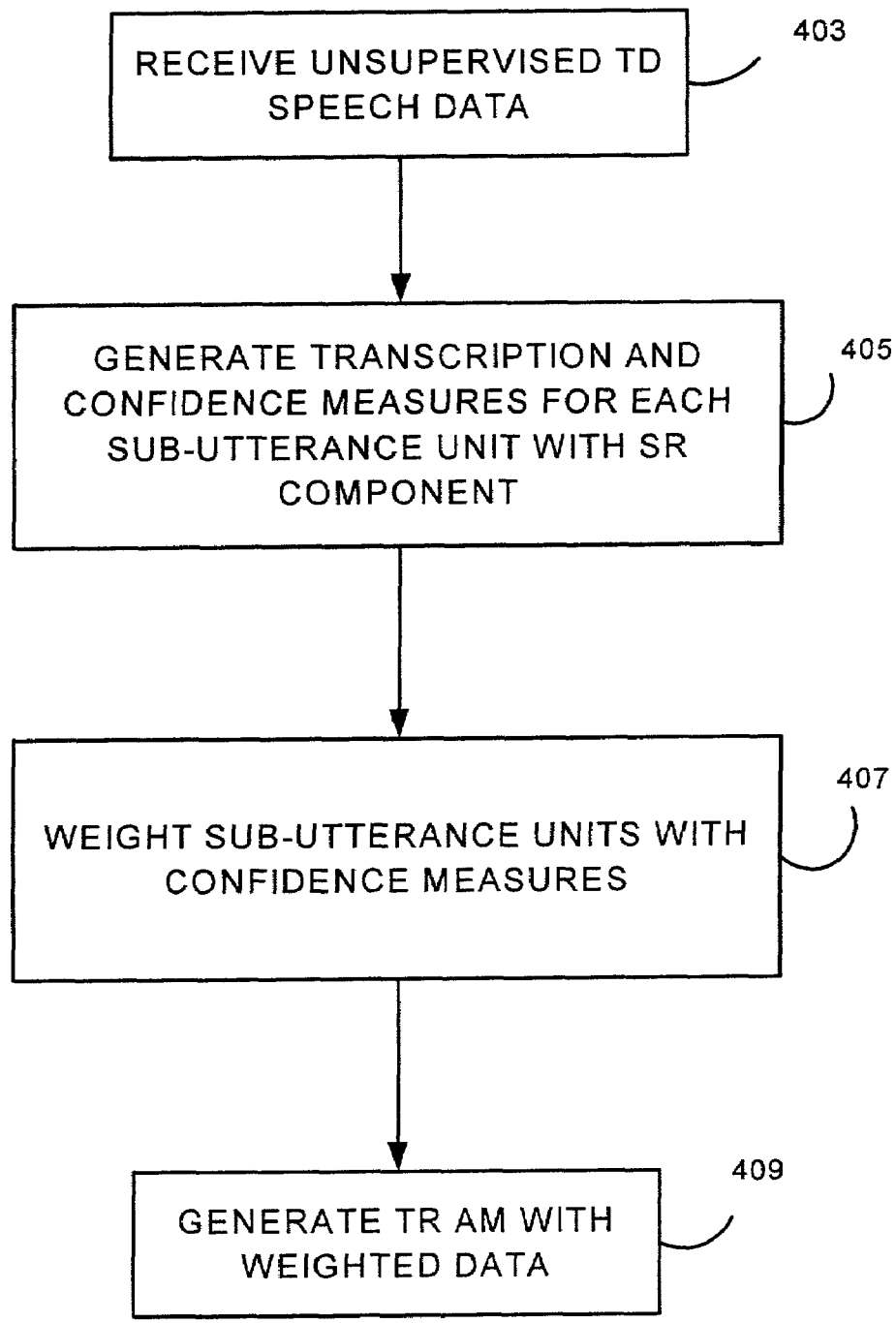
FIG. 10 is a flow diagram illustrating the operation of the system shown in FIG. 9.

FIG. 9 is a block diagram of a system 401 for generating a task-dependent acoustic model from unsupervised training data. FIG. 9 shows unsupervised speech training data (or utterances) 400. The training data is provided to a speech recognition component 402 which generates a plurality of outputs that are provided to weighting component 404. Weighting component 404 is coupled to an acoustic model training component 406 which outputs a confidence measure weighted task-dependent acoustic model 408. FIG. 10 is a flow diagram better illustrating the operation of the system shown in FIG. 9.

First, confidence measure training system 401 (and specifically speech recognition component 402) receives the unsupervised task-dependent speech data 400. Of course, the unsupervised task-dependent speech data is simply task-dependent, recorded speech data, for example in the form of WAV files, without a corresponding transcription. That data is fed to speech recognition component 402.

It is known that many state-of-the-art speech recognizers have a component which computes a confidence measure for words that the system recognizes. The confidence measure involves computing the acoustic and/or language model scores for the recognized words, compared with an expected score. The confidence measure is also often related to a score of a generic phone sequence network. The particular manner in which a confidence measure is computed is not important to the present invention. The present invention simply assumes that such a confidence measure is computed, and is made available, for each word recognized by the speech recognition system.

Further more it is assumed that the value of the confidence measure is between 0 and 1:

$$0<=\Phi(w)<=1 \qquad \text{Eq.8}$$

where $\Phi(w)$ and CONF(w) will be used to represent the confidence measure, interchangeably. Receiving the unsupervised data is indicated by block 403 in FIG. 10.

Once speech recognition component 402 receives the unsupervised, task-dependent speech data, speech recognition component 402 performs speech recognition on the utterances in data 400. Speech recognition component 402 illustratively passes through the acoustic data (as WAV files) corresponding to the utterances as designated by numeral 400. Speech recognition component 402 also illustratively outputs both a transcription of a sequence of recognized words 412, for the utterances input to speech recognition component 402, as well as the confidence scores (or confidence measures) for each sub-utterance unit (such as for each word). The confidence measures are designated by numeral 414. Generating the transcription and confidence scores is indicated by block 405 in FIG. 10.

The acoustic data 400, the transcription of the words 412 and the confidence measures 414 are all input to weighting component 404. Weighting component 404 weights each segment of the data (each word) with CONF(w) and provides it to acoustic model training component 406. This is indicated by block 407.

Thus, each of the data segments is weighted by the confidence score during the maximum likelihood hidden Markov model (ML HMM) training process. Training component 406 thus outputs a confidence measure weighted, task-dependent acoustic model (the TD model 408) which is generated from data in which highly confident speech segments are weighted most highly, and the speech segments that correspond to a lower confidence are weighted lower, such that they have little or no impact on TR model 408. Assuming that the confidence measure is relatively accurate, this prevents moving the model parameters in the wrong direction. Generating the TR model is indicated by block 409.

This is in contrast to other systems such as that discussed in D. Charlet, *Confidence-Measure Driven Unsupervised Incremental Adaptation for HMM-Based Speech Recognition*, ICASSP-2001, which use "all-or-nothing" strategy when dealing with unsupervised data. That is, if the confidence score of an entire utterance (which consists of multiple words) is above a threshold level, then the entire utterance is used, and all components of the entire utterance are weighted uniformly to update the model. Otherwise, if the confidence score for the entire utterance is below a threshold level, the entire utterance is simply discarded. Of course, the present invention is highly advantageous over this type of system, because the present invention uses individual words that have a high confidence associated with them, while it does not use (or at least places lower emphasis on) words that have a low confidence associated with them.

The present invention for dealing with unsupervised task-dependent training data can also be used in combination with the task-relevance training systems 209 and 300 discussed above with respect to FIGS. 4 and 6. Such a system is illustrated as system 500 shown in FIG. 11. System 500 contains a number of items discussed in previous Figures, and those items are similarly numbered. FIG. 12 is a flow diagram which better illustrates the operation of system 500.

System 500 first generates the task relevance weighted task-dependent acoustic model (TR model 202 or 320), depending on which task relevance training system from the above Figures is used. This is indicated by block 505 in FIG. 12. Next, system 500 generates the confidence measure weighted task-dependent acoustic model (the TD model) 408 as discussed with respect to FIG. 9. This is indicated by block 507 in FIG. 12. System 500 then smoothes TD model 408 with TR model 202 or 320 to obtain a composite acoustic model, which is a task-adapted (TA) model 502. This is indicated by blocks 509 and 511 in FIG. 12.

In accordance with one embodiment of the present invention, models 408 and 202 or 320 are provided to data volume weighting component 504. Component 504 weights each of the parameters or phonetic units in each acoustic model based on a volume of data used to generate the parameter or phonetic unit. Thus, the volume of supervised data used to generate each Gaussian or senone (designated by numeral 506) is provided to component 504, as is the volume of unsupervised data used to generate each Gaussian or senone in TD model 408. This is designated by block 508. Once the components are weighted, they are fed to acoustic model generation component 510 which generates the TA model 502 based on the weighted contributions of the other acoustic models 408 and 202 or 320.

Figure 11:
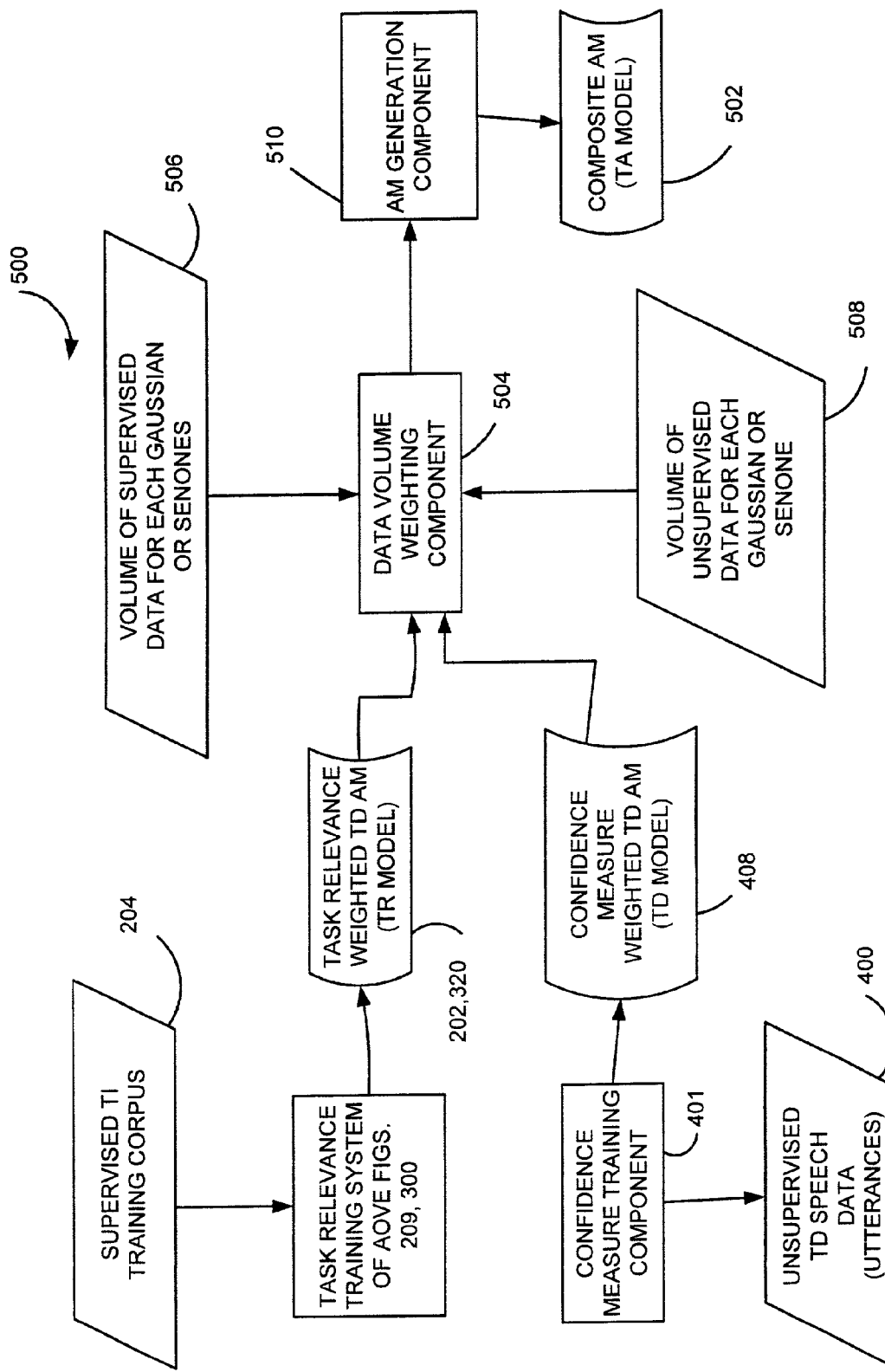
FIG. 11 is a block diagram similar to the system shown in FIG. 9, but combined with supervised task-independent training data.
Figures 1, 11:
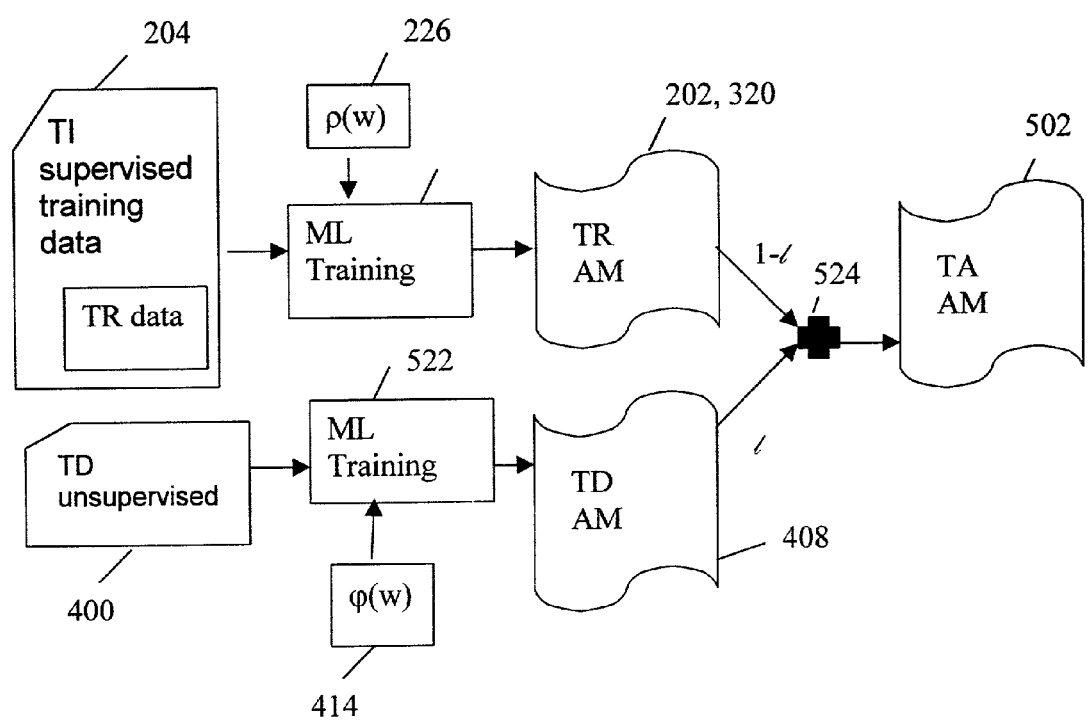
Figures 2, 11:
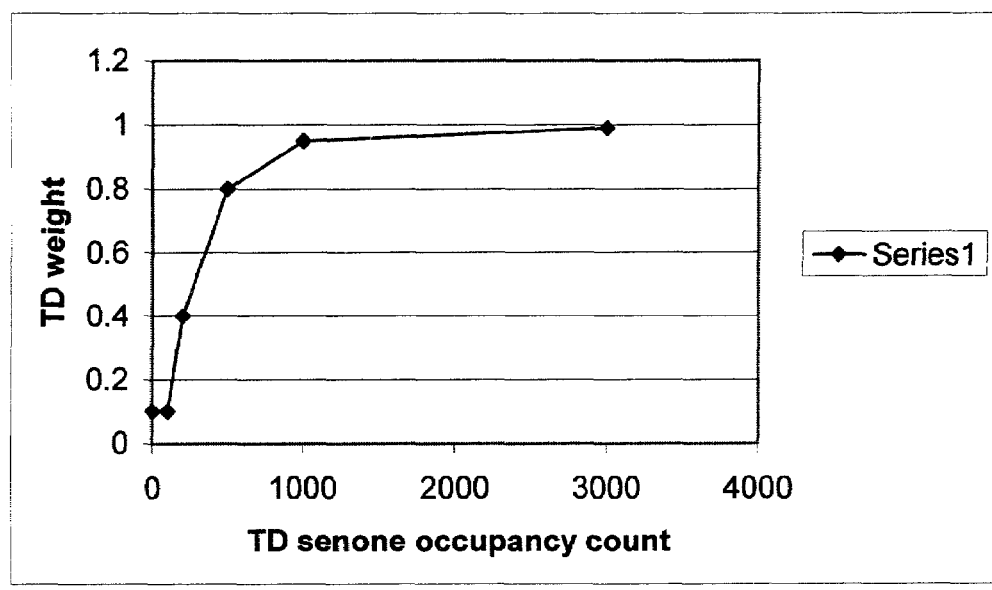
Figure 12:
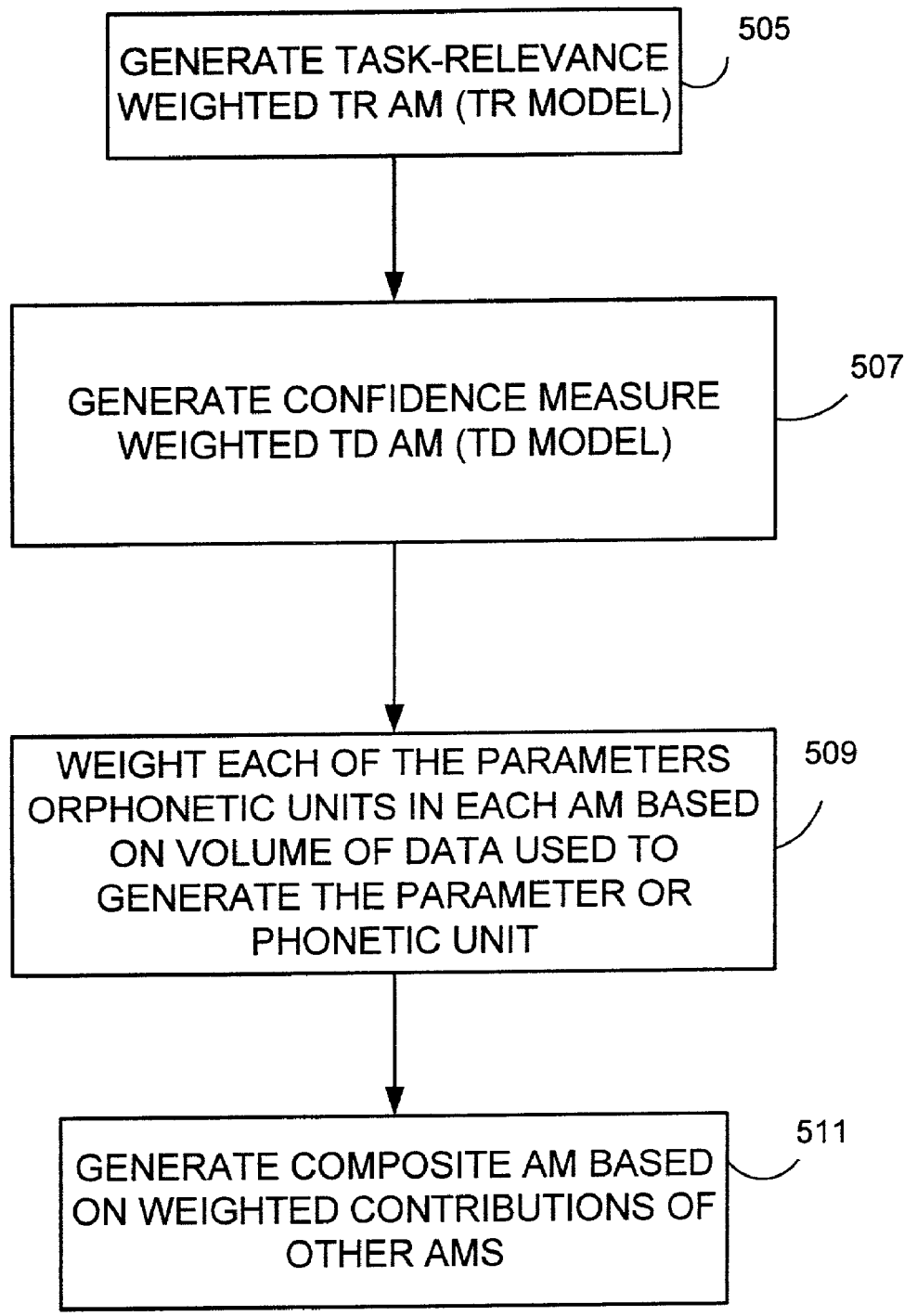
FIG. 12 is a flow diagram illustrating the operation of the system shown in FIG. 11.
Figures 1, 12:
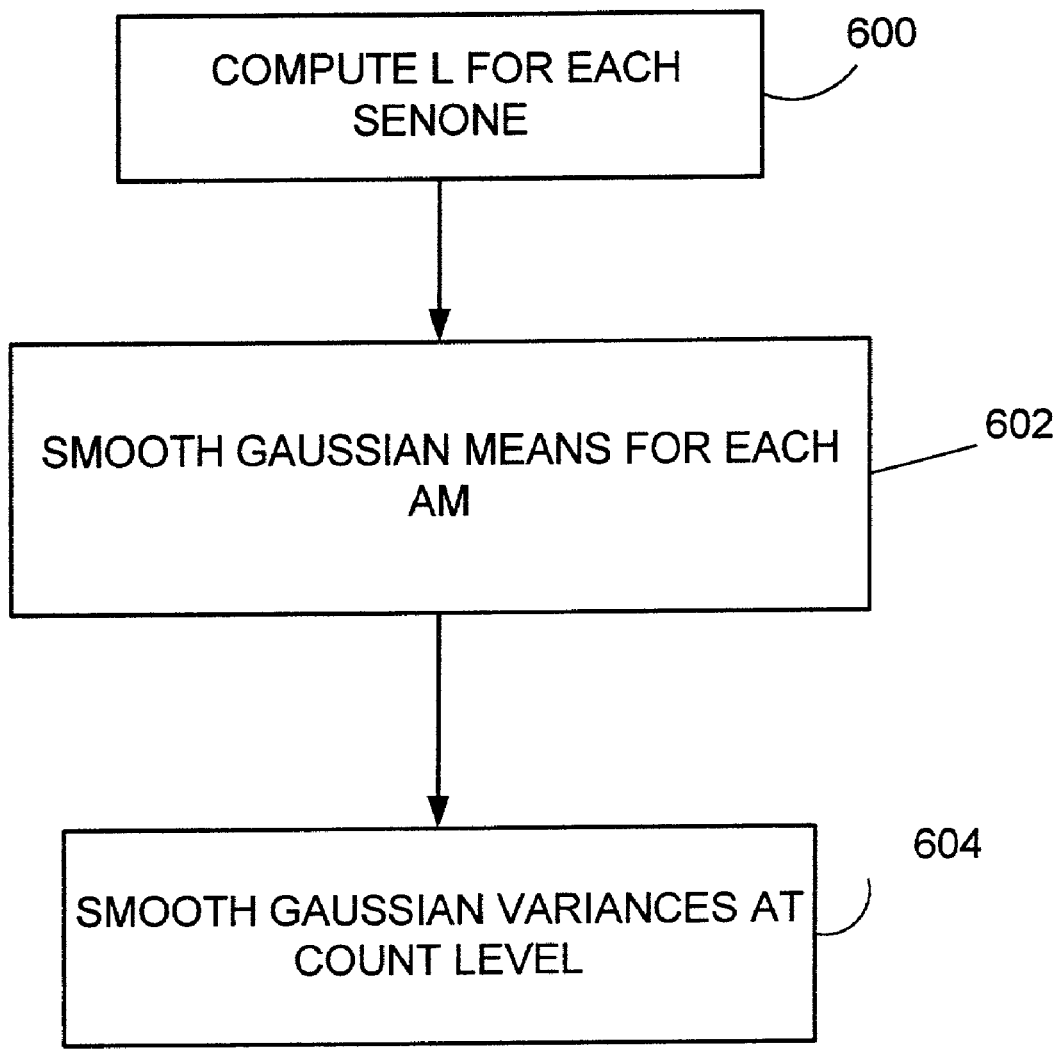

FIG. 11-1 illustrates system 500 in a slightly different way to more easily describe weighting component 504. Similar items are similarly numbered to those previously discussed. The diagram has been simplified, however, by simply showing ML training blocks 520 and 522, which represent the particular model training mechanism being used. However, as shown in FIG. 11-1, system 500 smoothes TR model 202 or 320 with TD model 408 to obtain final TA model 502. In doing so, system 500 combines models 202 or 320 and 408 at combination component 524. Component 524 first computes a weighting coefficient l for each senone (for each shared HMM state). The weighting coefficient l is piecewise linearly proportional to the TD occupancy count of that senone. For example, FIG. 11-2 shows an exemplary graph of weighting coefficient l against senone TD occupancy count (i.e., the occupancy count from the TD unsupervised data). The operation of system 500 shown in FIG. 11-1 is better illustrated by the flow diagram shown in FIG. 12-1. Computing weight l for each senone is illustrated in block 600 of FIG. 12-1. Then, the Gaussian means for the acoustic models are smoothed at the mathematical mean as follows:

$$\mu = l\mu_{TD} + (1-l)\mu_{TR} \qquad \text{Eq.9}$$

where $\mu_{TD}$ is the mathematical mean for TD model 408; and $\mu_{TR}$ is the mathematical mean for TR model 202 or 320. This is indicated by block 602 in FIG. 12-1.

It can be seen that, once the count in the task dependent data is large enough, the final mean $\mu$ will be determined primarily by the task-dependent data, regardless of how large the task-independent corpus is. In this way, the mean can be adjusted faster, even if the task-independent model is trained on an extremely large corpus.

Of course, other variations can be used as well. For example, it should be noted that if the recognition accuracy of the task dependent data is exceptionally low, then the l function should be less aggressive.

Once the Gaussian means have been smoothed, the Gaussian variances are smoothed based on occupancy counts. This is indicated by block 604 in FIG. 12-1. In this way, the variances will be significantly affected only if a significantly large amount of TD training data are observed, as follows:

$$\begin{aligned}
\sigma^2 &= E(Z-\mu)^2 \qquad \text{Eq. 10}\\
&= EZ^2 - 2\mu EZ + \mu^2 \\
&= \left( l\sum r(x)x^2 + (1-l)\sum r(y)y^2 \right) / \\
&\quad (la + (1-l)b) + \mu^2 - 2\mu(la\mu_{TD} + (1-l)b\mu_{TI}) / \\
&\quad (la + (1-l)b).
\end{aligned}$$

where Z is the combined weighted data from TD model 408 and TR model 202 or 320;

a=Σσ(x) for all task dependent data aligned with the present senone; and b=Σσ(y) for all TR data belonging to the present senone.

Particulary in our internal lab experiments, we found 11% relative error rate reduction with unsupervised TD training described above compared with the baseline supervised TI acoustic model.

Figure 13:
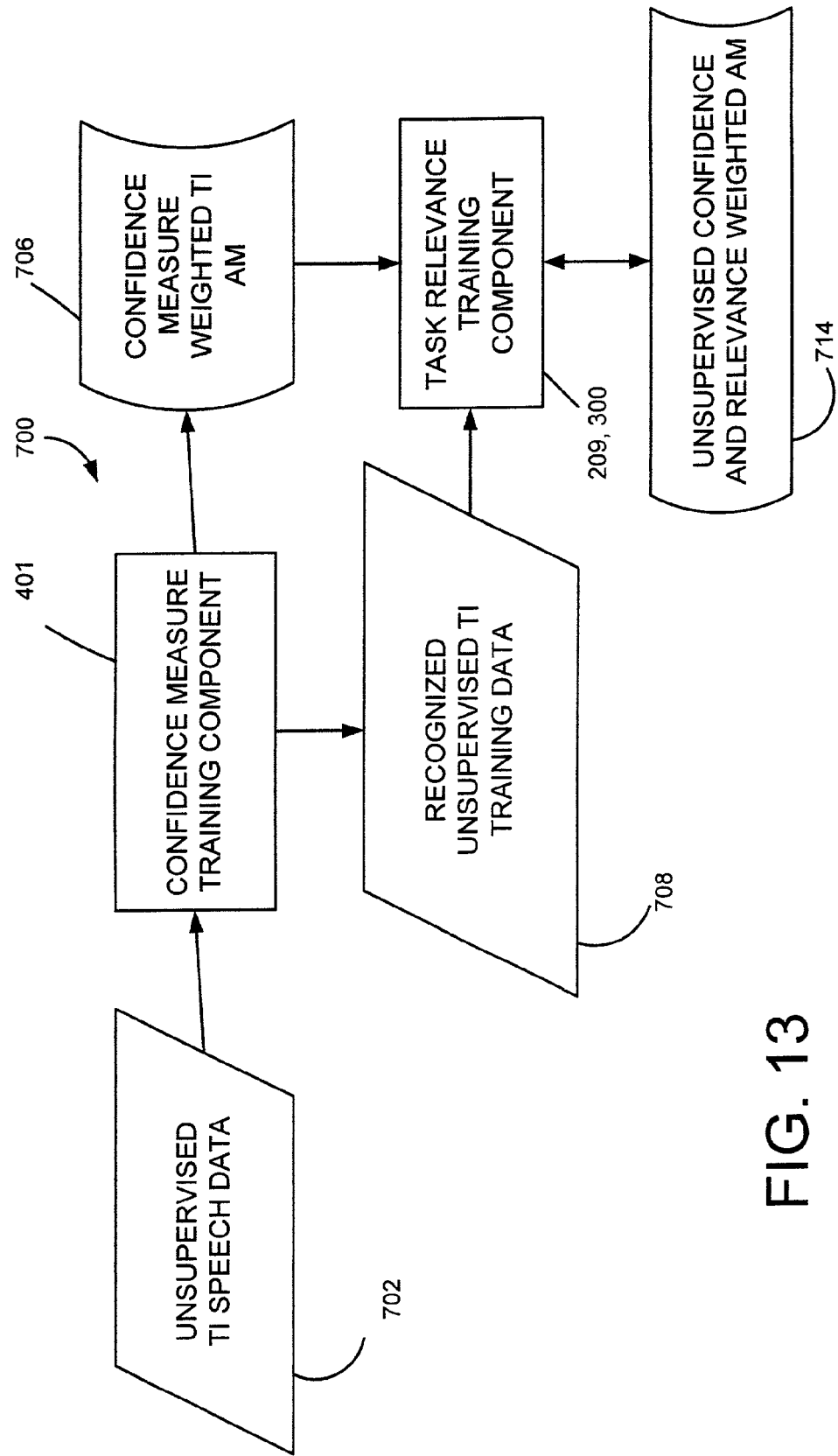
FIG. 13 is a block diagram of a system for generating a confidence and relevance weighted acoustic model from unsupervised, task-independent speech data.
Figure 14:
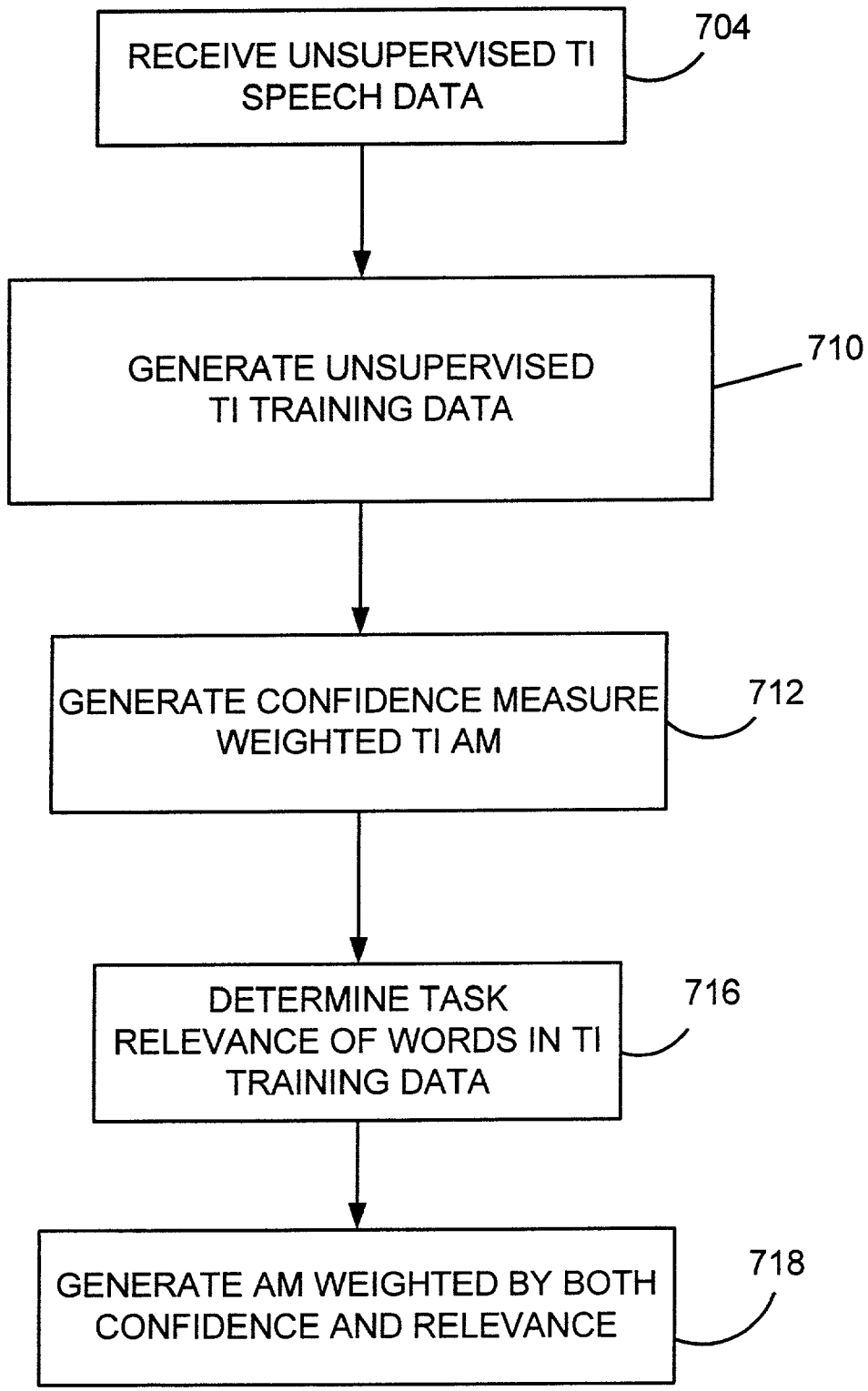
FIG. 14 is a flow diagram illustrating the operation of the system shown in FIG. 13.

FIGS. 13 and 14 illustrate yet another embodiment of the present invention. FIG. 13 illustrates a system 700 for generating a task-dependent acoustic model based on unsupervised, task-independent speech data only. FIG. 14 is a flow diagram better illustrating the operation of system 700 shown in FIG. 13.

While the prior embodiments have either dealt with supervised, task-independent training data 204 or unsupervised, task-dependent training data 400, system 700 utilizes unsupervised, task-independent training data 702. The unsupervised task-independent training data 702 illustratively includes acoustic data representative of speech, which may or may not be relevant to the task at hand, and for which no known transcriptions are available. This information is illustratively received, as indicated by block 704 in FIG. 14. Then we run SR component 402 to generate hypothesized transcriptions 708 and confidence measure CONF(w) 706. Then each word w in the hypothesized transcriptions is assigned a task relevance TR(w) by component 214. Finally in 718 we define the weight of each word w to be the product of TR(w) and CONF(w), and then train as usual to obtain the final model, which is now weighted both by task relevance and confidence score.

It should be noted that acoustic model 714 is based on unsupervised data, but it is weighted with the confidence measure generated by the speech recognizer in block 401 and it is also weighted by the relevance measure generated by the task relevance training component 209 or 300. It should further be noted that acoustic model 714 can be input to the combining component 524 illustrated in FIG. 11-1, and the acoustic model 714 can contribute to the ultimate acoustic model 502 as well. In that case, system 500 can receive, as training data, task-dependent, unsupervised training data; task-independent, supervised training data; and unsupervised, task-independent training data. Of course, the weighting component is slightly modified to accomodate weighting three acoustic models, instead of two, during combination to obtain the ultimate task-adapted acoustic model 502.

Although the present invention has been described with reference to particular embodiments, workers skilled in the art will recognize that changes may be made in form and detail without departing from the spirit and scope of the invention.

What is claimed is:

1. A method of generating a task-dependent acoustic model from a task-independent (TI) training corpus that includes an acoustic representation of an utterance and a sequence of transcribed words corresponding to the acoustic representation, the method comprising:
    deriving a task relevance measure for each word in the TI training corpus, indicative of a relevance of the words to a task; and
    generating a task-dependent (TD) acoustic model (AM) based on the TI training corpus and the task relevance measures for the words in the TI training corpus, by training a task-independent (TI) AM based on the TI training corpus, the TI AM including words from the TI training corpus and associated AM parameters, and weighting the AM parameters with the task relevance measures for the words corresponding to the AM parameters.

2. The method of claim 1 wherein generating the TD AM comprises:
    combining the weighted AM parameters to obtain the TD AM.

3. The method of claim 1 wherein generating a TD AM comprises:
    weighting words in the TI training corpus.

4. The method of claim 3 wherein generating a TD AM comprises:
    training the TD AM using the weighted words.

5. The method of claim 1 wherein generating a TD AM comprises:
    extracting relevant data from the TI training corpus based on the task relevance measures.

6. The method of claim 5 wherein generating a TD AM comprises:
    training the TD AM based on the relevant data.

7. The method of claim 1, wherein deriving a task relevance measure comprises:
    selecting a word from the TI training corpus; and
    defining the task relevance measure for the selected word based on a portion of the selected word that is found in the task.

8. The method of claim 7 wherein defining the task relevance measure for the selected word, comprises:
    defining the task relevance measure for the selected word based on a number of relevant triphones in the selected word, the number of relevant triphones being triphones in the selected word that are found in the task.

9. The method of claim 8 wherein the relevance measure for the selected word is defined as a ratio of the number of relevant triphones to a total number of phones in the selected word.

10. The method of claim 1 wherein deriving a relevance measure comprises;
    selecting a word from the TI training corpus; and
    determining whether the entire selected word is in the task.

11. The method of claim 10 wherein deriving a relevance measure comprises:
    defining the relevance measure as relevant if the entire selected word is in the task; and
    defining the relevance measure as irrelevant if the entire selected word is not in the task.

12. A system for generating a task-dependent (TD) acoustic model (AM) from a task-independent (TI) training corpus, comprising:
    a task relevance generator receiving a task input indicative of words relevant to a task and configured to generate a relevance measure for each word in the TI training corpus based on the task input, wherein the task relevance generator is configured to generate the relevance measure for a selected word based on whether the entire selected word is in the task input; and
    an AM generator, coupled to the TI training corpus and the task relevance generator and configured to generate the TD AM based on the TI training corpus and the relevance measure.

13. The system of claim 12 wherein the task relevance generator is configured to generate the relevance measure for a selected word based on a number of phonetic units in the selected word that are in the task input.

14. The system of claim 12 wherein the AM generator comprises:
    an AM training component configured to train a TI AM having AM parameters associated with words;
    a weighting component configured to weight the AM parameters with the relevance measures for the words associated with the AM parameters; and
    a parameter combining component configured to combine the weighted AM parameters to obtain the TD AM.

15. The system of claim 12 wherein the words in the TI training corpus are weighted with the relevance measures and wherein the AM generator comprises:
    an AM generator generating the TD AM from the weighted words.

16. A computer readable medium storing instructions which, when executed, cause a computer to perform the steps of:

defining a plurality of task relevance measures, each corresponding to a word in a task-independent (TI) training corpus, the task relevance measures each being indicative of a relevance of its corresponding word to a predetermined task; and generating a task-dependent (TD) acoustic model (AM) based on the TI training corpus and the relevance measures, by generating a TI AM from the TI training corpus, and modifying the TI AM with the relevance measures to obtain the TD AM.

17. The computer readable medium of claim 16 wherein generating the TD AM comprises:

modifying the TI training corpus with the relevance measures; and generating the TD AM based on the modified TI training corpus.

18. A method of generating a task-dependent acoustic model from a task-independent (TI) training corpus that includes an acoustic representation of an utterance and a sequence of transcribed words corresponding to the acoustic representation, the method comprising:

deriving a task relevance measure for each word in the TI training corpus, indicative of a relevance of the words to a task by selecting a word from the TI training corpus, defining the task relevance measure for the word based on a number of relevant triphones in the selected word, the number of relevant triphones being triphones in the selected word that are found in the task, wherein the relevance measure for the selected word is defined as a ratio of the number of relevant triphones to a total number of phones in the selected word; and generating a task-dependent (TD) acoustic model (AM) based on the TI training corpus and the task relevance measures for the words in the TI training corpus.

19. A system for generating a task-dependent (TD) acoustic model (AM) from a task-independent (TI) training corpus, comprising:

a task relevance generator receiving a task input indicative of words relevant to a task and configured to generate a relevance measure for each word in the TI training corpus based on the task input; and an AM generator, coupled to the TI training corpus and the task relevance generator and configured to generate the TD AM based on the TI training corpus and the relevance measure, wherein the words in the TI training corpus are weighted with the relevance measures and wherein the AM generator is configured to generate the TD AM from the weighted words.

20. A computer readable medium storing instructions which, when executed, cause a computer to perform the steps of:

defining a plurality of task relevance measures, each corresponding to a word in a task-independent (TI) training corpus, the task relevance measures each being indicative of a relevance of its corresponding word to a predetermined task; and generating a task-dependent (TD) acoustic model (AM) based on the TI training corpus and the relevance measures, by modifying the TI training corpus with the relevance measures, and generating the TD AM based on the modified TI training corpus.

* * * * *

UNITED STATES PATENT AND TRADEMARK OFFICE
CERTIFICATE OF CORRECTION

| | | |
|---|---|---|
| PATENT NO. | : 7,006,972 B2 | Page 1 of 1 |
| APPLICATION NO. | : 10/103642 | |
| DATED | : February 28, 2006 | |
| INVENTOR(S) | : Mei Yuh Hwang | |

It is certified that error appears in the above-identified patent and that said Letters Patent is hereby corrected as shown below:

In column 4, line(s) 1–2, above "FIG. 1" delete "DETAILED DESCRIPTION OF ILLUSTRATIVE EMBODIMENTS".

In column 14, line 55, delete "Particulary" and insert -- Particularly --, therefor.

In column 15, line 27, delete "accomodate" and insert -- accommodate --, therefor.

In column 16, line 4, in Claim 7, after "1" delete ",".

In column 16, line 21, in Claim 10, after "comprises" delete ";" and insert -- : --, therefor.

In column 17, line 25–26, in Claim 18, delete "the word" and insert -- the selected word --, therefor.

Signed and Sealed this

Thirtieth Day of March, 2010

David J. Kappos
*Director of the United States Patent and Trademark Office*